(12) United States Patent
Federl et al.

(10) Patent No.: US 6,618,632 B1
(45) Date of Patent: Sep. 9, 2003

(54) PROCESS FOR MONITORING PROCESSING PLANTS

(75) Inventors: Peter Federl, Pentling (DE); Gerhard Pöppel, Regensburg (DE); Frank Wachtmeister, Regensburg (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/581,665

(22) PCT Filed: Dec. 11, 1998

(86) PCT No.: PCT/DE98/03652
§ 371 (c)(1),
(2), (4) Date: Apr. 24, 2001

(87) PCT Pub. No.: WO99/30127
PCT Pub. Date: Jun. 17, 1999

(30) Foreign Application Priority Data

Dec. 11, 1997 (DE) .......................................... 197 55 133

(51) Int. Cl.$^7$ ................................................. G05B 13/02
(52) U.S. Cl. ............................ 700/47; 700/14; 700/55; 700/121; 700/159; 700/110; 700/143
(58) Field of Search ............................... 700/14, 47, 55, 700/121, 159, 110, 143

(56) References Cited

U.S. PATENT DOCUMENTS

| 5,361,628 A | * | 11/1994 | Marko et al. ................. 73/116 |
| 5,566,092 A | * | 10/1996 | Wang et al. ................. 702/185 |
| 5,657,397 A | * | 8/1997 | Bokser ........................ 382/225 |
| 5,675,497 A | * | 10/1997 | Petsche et al. ............... 702/182 |

FOREIGN PATENT DOCUMENTS

| EP | 461793 A2 * | 12/1991 | ............ G06F/15/72 |
| EP | 602932 A2 * | 6/1994 | ............. G06K/9/62 |
| EP | 783170 A1 * | 7/1997 | ........... G11C/29/00 |
| EP | 790574 A2 * | 8/1997 | ............. G06K/9/66 |

OTHER PUBLICATIONS

Koppen–Seliger B. and P.M. Frank Detection and Isolation in Technical Processes with Neural Networks, Dec. 13, 1995, Conference on Decision & Control, vol. 3, pp. 2414–2419.*

Hudak M. J. and P.M. Frank, RCE Networks: An Experimental Investigation, Jul. 8, 1991, Proceedings of the international Joint Conference on Neural Networks, pp. 849–854.*

N. Tsumura et al., Reliable Classification by Double Hyperspheres in Pattern Vector Space, Oct., 1995, Adaptive Intelligent Energy Systems Conference, vol. 28, No. 3 pp. 1621–1626.*

M. Polycarpou et al., Learning Methodology for Failure Detection and Accommodation, Jun., 1995, IEEE Control Systems. Mag, vol. 15, No. 3 pp. 16–24.*

* cited by examiner

Primary Examiner—Ramesh Patel
Assistant Examiner—Thomas Pham
(74) Attorney, Agent, or Firm—Laurence A. Greenberg; Werner H. Stemer; Gregory L. Mayback

(57) ABSTRACT

A method of monitoring and/or controlling machining plans having time-dependent machining parameters includes measuring desired time-dependent machining parameters as a measured curve, generating time-independent numerical values from the measured machining parameters, and entering the time-independent numerical values into a classifier distinguishing between normal states of the machining plant and abnormal states of the machining plant. Training vectors regarded as abnormal can be filtered out from training vectors available by determining a distance of each training vector from every other training vector with a selected measure of distance for filtering of the abnormal training vectors, the training vectors having components made of time-independent numerical values, and the classifier can be trained with training vectors.

17 Claims, 2 Drawing Sheets

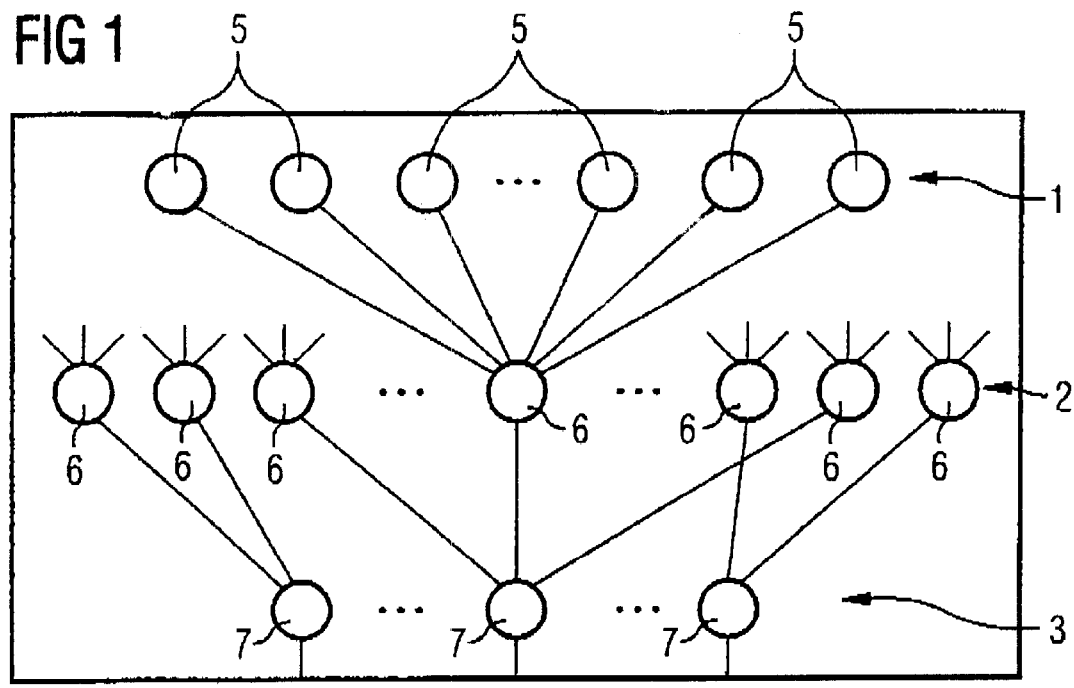
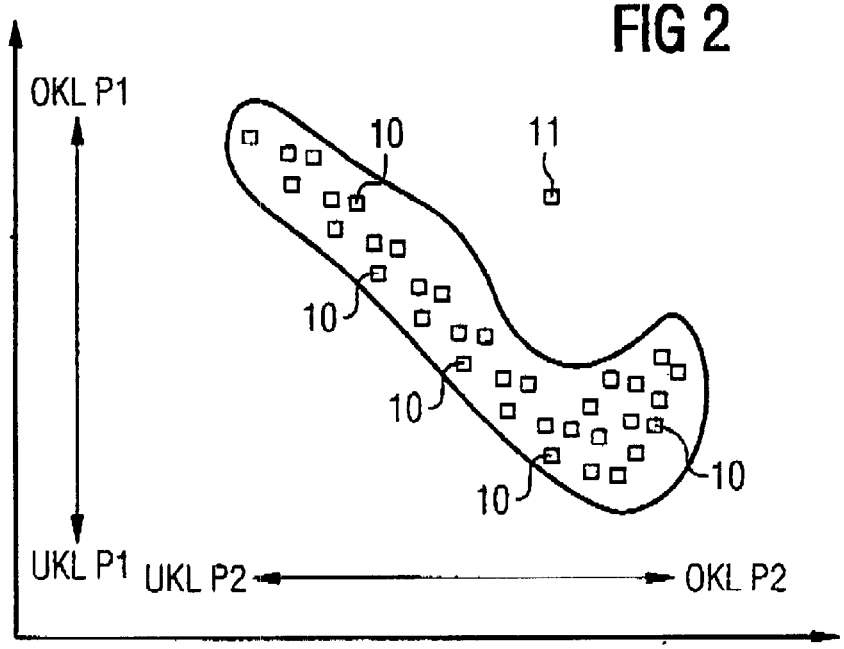

PROCESS FOR MONITORING PROCESSING PLANTS

BACKGROUND OF THE INVENTION

Field of the Invention

The present invention relates to a method of monitoring or controlling machining plants, in particular a method of monitoring or controlling machining plants for the production of integrated semiconductor products.

Modern industrial production is generally characterized by a high degree of automation. In the semiconductor industry in particular, a high degree of automation is an essential requirement for being internationally competitive.

During manufacture, the products pass through a series of machining steps, which are performed in an automated manner on the product to be machined by various machining plants. For example, in the production of an integrated semiconductor product, the product passes through up to 600 process steps, which for a large part can be carried out only with highly specialized machining plants in a cleanroom environment. In this case, a number of identical machining plants are often combined to form a machining area ("bay").

The costs for such automated production are influenced to a great extent by the question as to how well and efficiently the manufacturing process can be monitored or controlled, so that the ratio of defect-free products to the overall number of products manufactured (=yield) assumes as great a value as possible.

Unfortunately, the individual machining steps are subject to fluctuations and irregularities, which in the worst case may mean, for example, the defect of a number of chips or the entire wafer or the failure of a machining plant. Therefore, each individual machining step must be carried out as stably as possible in order to ensure an acceptable yield after the completed processing of a wafer.

In the prior art there are extensive methods available for localizing possibly present defects on a wafer and assigning these defects to particular machining steps. However, some of these methods use data which are only obtained from the complete machining of a wafer. Therefore, tracing back a defect is often only possible with very great effort.

For example, after the completion of a wafer, various electrical and functional parameters, such as current yields, turn-on voltages of transistors, stand-by currents, etc., are measured under different timing conditions in the wafer test area and subsequently evaluated by the production engineers. The defect evaluation is extremely complicated, since it has to be established retrospectively which machining steps were carried out improperly.

The time taken for a wafer to pass through a production line may be up to 8 weeks. If, for example, a serious defect occurs after a machining time of only 2 weeks, this defect may possibly be detected only after a further 6 weeks of processing. On the one hand, the production line is consequently unnecessarily occupied with reject products, on the other hand, due to the time delay, many further defective wafers are produced before the cause of the defect can be eliminated.

To alleviate this problem, there are, in addition, control instruments which analyze data acquired during or after a production step or a number of production steps.

For example, after certain machining steps, wafers are removed from the production process and visually analyzed with a scanning electron microscope (SEM). Unfortunately, these methods are very time-consuming and labor-intensive and therefore take place only on the basis of random sampling.

In the method of "Univariate Statistical Process Control (SPC)", the process results (for example line widths or layer thicknesses on 2 wafers of a batch) are checked after a logically related sequence of process steps (for example coating, exposure to light and subsequent etching). If deviations from the desired value occur measures are taken to eliminate the causes of the defects. However, this gives rise to the difficulty of establishing at which of the machining steps coming into question the cause of the deviations is to be found.

In the method of "Univariate Statistical Equipment Control (SEC)", measurement data, such as the process temperature, voltage, power, gas flow and pressure for example, are acquired in every process step via the so-called equipment link and entered on control cards. These control cards are checked at several machining steps to ascertain whether the parameter acquired is within the range of an upper control line (UCL) and a lower control line (LCL). If the measured values are between the LCL and UCL, the current process is considered to be normal. Since, however, it is not possible to investigate manually all parameter curves for all plants, because of the great effort this involves, one restricts oneself to the most important parameters. However, even if one restricts oneself to the most important parameters, this primarily visual method of control can be applied at most to a 3-dimensional set of parameters. Even with a 2-dimensional set of parameters, the method becomes very unclear. For example, the combination of two normal parameters may be abnormal, i.e. possibly lead to a chip or plant defect. Such multidimensional combinational effects cannot be resolved with the conventional methods. Furthermore, the management and analysis of the control cards are very time-consuming.

SUMMARY OF THE INVENTION

The publication "Fault Detection and Isolation in Technical Processes with Neural Networks" by B. Köppen-Seliger et al., appearing in Proceedings of the 34th Conference on Decision & Control New Orleans, La. December 1995, describes a concept for the detection and isolation of defects in technical processes which is based on the use of an RCE network ("Restricted Coulomb Energy Neural Network"). Furthermore, the document U.S. Pat. No. 5,361,628 (Kenneth A. Marko et al.) discloses a method of evaluating an engine test with the aid of neural networks. However, the methods mentioned require suitably controlled preliminary tests in order to allow the neural networks used to be appropriately trained. Corresponding preliminary tests with "good" machining plants under stable conditions require a very great effort, however, which generally cannot be provided in a production environment.

It is therefore the object of the present invention to provide a method of monitoring and/or controlling machining plants which avoids or alleviates the disadvantages mentioned of the conventional methods.

Further advantageous embodiments, refinements and aspects of the present invention emerge from the subclaims, the description and the attached drawings.

According to the invention, a method of monitoring and/or controlling machining plants which have time-dependent machining parameters is provided. The method according to the invention comprises the following steps:

a) desired time-dependent machining parameters are measured as a measured curve,
b) time-independent numerical values are generated from the measured machining parameters, and
c) the time-independent numerical values are entered into a classifier, which distinguishes between normal states of the machining plant and abnormal states of the machining plant.

The method according to the invention is characterized in that the classifier is trained with training vectors of which the components are time-independent numerical values, and, to prepare for the training of the classifier, those training vectors which are regarded as "abnormal" are filtered out from the training vectors available, the distance of each training vector from every other training vector being determined by means of a suitably selected measure of distance for the filtering of the abnormal training vectors.

The method according to the invention has the advantage that the analysis of the data takes place fully automatically. A time-intensive, and consequently cost-intensive, "manual" monitoring of machining plants can be avoided. All the desired parameters can be processed simultaneously and in parallel, immediately after the ending of a machining step. A time delay between the occurrence of a defect and its detection, as is customary with conventional monitoring of the machining plants, is prevented.

Furthermore, it is possible by the method according to the invention also to detect multidimensional combinational effects without any problem. Even those parameter combinations which indeed have effects on the way in which a plant functions although no conspicuous indications can be localized as yet in the product produced can be detected. In addition, the method according to the invention has the advantage that, to prepare for the training of the neural network, the training vectors available are analyzed precisely. From all the training vectors available, those which have to be regarded as "abnormal" are filtered out and excluded from the training.

A neural network is preferably used as the classifier. Such a neural network may be used in the form of a hardware solution or a software solution.

In particular, it is preferred if an RCE network is used. RCE stands here for Restricted Coulomb Energy. The RCE network has the task of delimiting the allowable parameter range and separating various categories from one another and, during the so-called "recall", classifying the test vectors. For the separation, n-dimensional hyperspheres or hypersquares are preferably used.

An RCE network has the advantage that the feature space is divided into complex subregions, which do not necessarily have to be contiguous. Many other types of network separate the feature space by hyperplanes. This has the disadvantage that only problems which have a classification which can be described by planar sections can be processed. The RCE network allows virtually any desired separation of the feature space. Furthermore, in an RCE network the number of hidden-layer neurons is fixed during training, in other words does not have to be known from the beginning. In addition, in an RCE network the weight vectors do not have to be preassigned values, as in the case of other networks. In the RCE network there is no "overtraining" as in the case of most networks trained with the backpropagation algorithm. In backpropagation networks, the number of learnable patterns is restricted by the number of neurons. If training goes beyond the maximum possible number of patterns, previously learned patterns are "forgotten" again. In addition, in an RCE network new classes can be added to an already trained network without having to completely retrain the network.

Selection of the learning data is decisive for the successful use of a classifier. As a rule, parameter values which frequently occur are considered typical or normal. During the training of a classifier, parameter values which are untypical or are to be regarded as abnormal may also occur. Unfortunately, it was previously not easy to identify such abnormal parameter values.

Therefore, according to the invention, a method of filtering vectors regarded as abnormal from a set of vectors is provided. The method according to the invention is characterized in that the distance of each vector from every other vector is determined by means of a suitably selected measure of distance and those vectors for which the distance value K of the ordered sequence of distances in which a prescribed percentage of all the vectors have smaller distances from the vector in question exceeds a prescribed threshold value are filtered out.

This method has the advantage that it is not restricted with respect to the number of vectors and the dimensions of the vectors.

Further advantageous embodiments, refinements and aspects of this method emerge from the subclaims.

BRIEF DESCRIPTION OF THE DRAWINGS

The invention is represented in more detail below on the basis of figures of the drawing, in which:

FIG. 1 is a schematic flow diagram of an RCE network;

FIG. 2 is a graph of a two-dimensional numerical value space according to the invention.

FIG. 1 shows a schematic representation of an RCE network. The use of the RCE network is divided into two phases: in the "training phase", the network is presented example vectors, on the basis of which the feature space is divided into various classes. The classes of the example vectors must be known in the training, in other words this is "supervised learning".

DESCRIPTION OF THE PREFERRED EMBODIMENT

Figure 3:
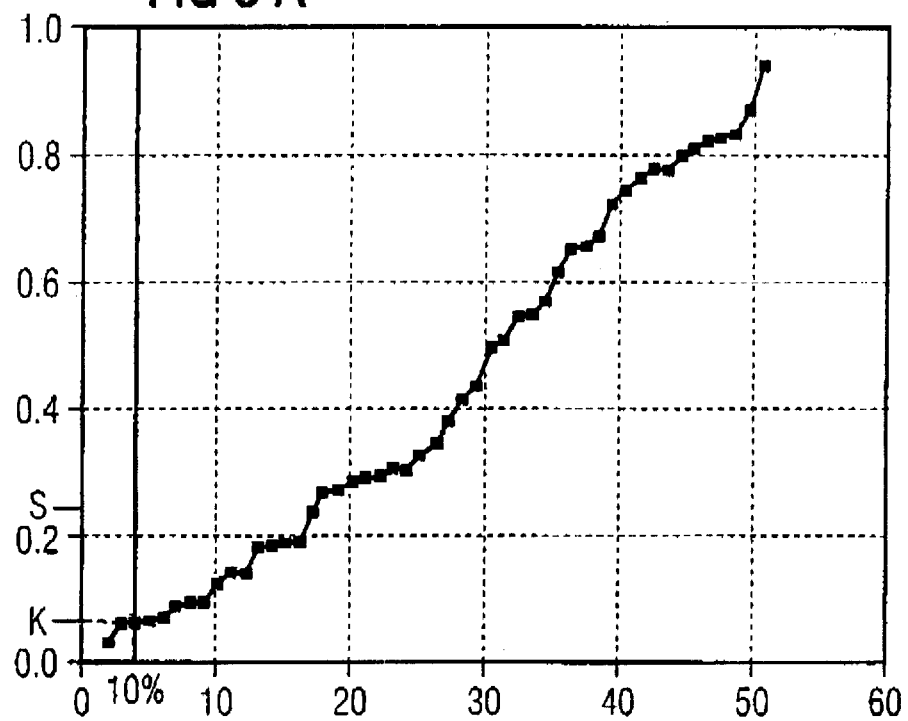
FIGS. 3a and 3b are each graphs showing distance plots for a normal state (FIG. 3a) and an abnormal state (FIG. 3b) according to the invention.
Figure 3:
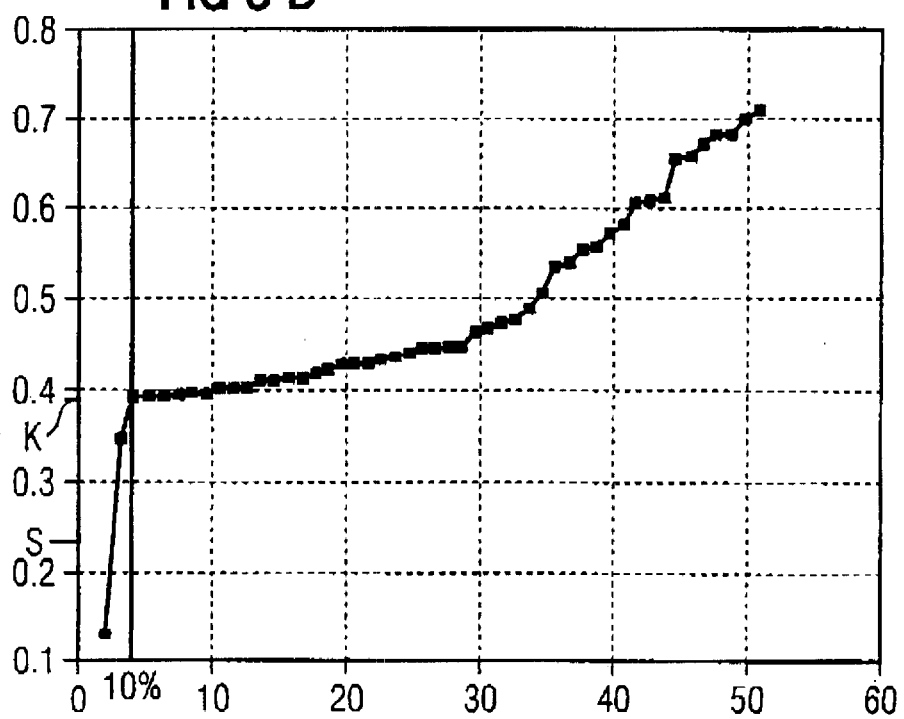

In the "recall phase", the network is presented test vectors for classification, and it is decided whether the test vector can be assigned to one (or possibly more) previously trained class(es) or lies outside the phase space described by the classes. Neural networks are capable within certain limits of abstracting from the known examples (at least locally), and also assigning non-trained data correctly within a prescribed tolerance.

An RCE network generally has three layers: an input layer 1, a hidden layer 2 and an output layer 3.

Each neuron 5 in the input layer 1 represents a dimension of the n-dimensional input vector. The input layer 1 is connected via "coupling vectors" (=weight vectors) to each neuron 6 of the hidden layer 2. All neurons 6 of the hidden layer 2 are connected to precisely one neuron 7 of the output layer 3, which represent the classifications.

In the training of the network, the weight vectors and the number of neurons 6 in the hidden layer 2 are dynamically determined, in other words do not have to be known a priori. Calculated as the propagation function in training, as well as in recall, is a measure of distance, for example the Euclidean distance or a scalar product, between the test vector and all the weight vectors. If the test vector deviates by less than a prescribed amount from the weight vectors, the corresponding neuron 6 of the hidden layer 2 fires and activates the corresponding output neuron 7. By contrast with a classical perceptron, the activations of the hidden layer 2 are in this case linked with one another via a logical OR function. The number of hidden-layer neurons 6 is determined during the training. If a number of neurons 6 are activated in the hidden layer, under certain circumstances the classification is not unique. The "memory" of the network is stored in the weight vectors, also known as prototypes.

If the scalar product with the weight vectors is used as the measure of distance in the assessment of the input vector and the assessment of the activations transmitted from the hidden layer to the output layer likewise takes place by means of a scalar product, the RCE network is a classical multi-layer perceptron. A sphere of influence, a hypersphere, with a prescribed radius, is formed around a prototype.

If the function:

$$d = \max_i |w_i^j - Y_i| < \lambda_j,$$

is used as the measure of distance, hypersquares with the edge lengths $\lambda_j$ are obtained as the spheres of influence. However, the network defined in this way no longer represents a classical multi-layer perceptron, but may be referred to as a "generalized" perceptron.

Graphically considered, a sphere of influence, known as a domain, a hypersquare or hypersphere with the radius $\lambda_j$ is fixed around a training vector in training. For further training vectors (prototype) it is tested whether the vector is in the sphere of influence of the already existing prototypes, in other words lies within the hypersquare or hypersphere with the radius $\lambda_j$. If this is not the case, a new prototype is generated and, as a result, the number of neurons of the hidden layer is increased.

To avoid a misclassification, in the training phase the corresponding edges of the hypersquare or the radius of the hypersphere of the newly generated prototype are drawn back and adapted to the already existing domains such that they no longer overlap. When drawing back a domain, the new edge length or radius is calculated volume-maximally.

When using hypersquares instead of hyperspheres, the phase space is covered more densely, since intermediate spaces occur when superposing hyperspheres. Therefore, fewer training examples are necessary to cover the feature space in the case of a hypersquare classifier.

For monitoring or controlling the machining plants it is preferred if the RCE network used receives as the input a vector normalized to the interval [−1, 1]. The components of this vector are obtained from the prepared raw data by time-independent characteristic numerical values being formed from time-dependent measured variables of the desired process parameters (pressure, temperature, gas flow, etc.). The measured variables usually have a differing value range, depending on the setting on the machining plant. It is therefore preferred if the individual measured variables are normalized. The interval [0, 1] is preferred as the normalizing range of the measured variables.

The direct processing of the normalized measured variables with an RCE network does not, however, lead as yet to usable results. Therefore, the time-dependent measured variables have to be transformed into time-independent numerical values. These numerical values preferably satisfy the following requirements:

"universality": the same algorithm is to be applicable for each parameter,

"similitude": similar curves produce similar numerical values,

"robustness": minor deviations in the curves change the numerical value only a little, "normalization": the numerical values are to be normalized to the interval [−1; 1].

There are a series of mathematical methods which allow the time-dependent measured variables to be transformed into time-independent numerical values, taking the requirements mentioned into account.

For instance, the time-dependent measured curve of a desired parameter can be approximated by polynomials. In this case, the measured curve is represented by a linear combination of the prescribed base functions. The coefficients $c_i$ of the linear combination which are obtained for example with a minimal weighted error sum of squares are suitable as numerical values and consequently as components of the input vector for the RCE network.

To save computing time, it is preferred in this case if orthogonal polynomials, for example Chebyshev polynomials, are used as base functions. The use of orthogonal polynomials also has the further advantage that only the coefficients of the newly added polynomials have to be calculated if, in addition to the coefficients already calculated, higher orders of the orthogonal polynomials are used.

The use of measures of distance is a further method for transforming the time-dependent measured variables into time-independent numerical values, taking the requirements mentioned into account.

For this purpose, a measured curve is discretized, in that measured values are interpreted at certain prescribed times as components of a vector x. If a comparison vector y, for example a polynomial at likewise prescribed locations, is given, various methods for obtaining measures of distance can be used to establish similarities between these vectors.

Many measures of distance are special cases of the so-called Minkowski q-metrics (also known as $L_q$-metric). In general, a Minkowski q-metric is defined as $$d_q(x, y) = (\Sigma_i^m |x^i - y^i|^q) 1/q$$

Each of these metrics is suitable for curve characterization. If the $d_q$ distance is calculated with a fixed q from the test vector x with respect to a reference y, a measure of the distance between the two vectors is obtained. If the distances with respect to a number of well-defined comparison curves is measured, the parameter curves can be characterized with selectable accuracy. The $d_q$ distances with respect to the various comparison curves are suitable as numerical values and consequently suitable as components of the input vector for the RCE network.

Used for example as comparison curves y are Chebyshev polynomials transformed to the interval [0; 1]. In addition to steady comparison curves, any desired composite functions can also be used, should this be necessary on account of the nature of the parameters measured.

A similar method is obtained if an "average" measured curve is calculated from all the normalized measured curves available for each desired parameter. Then various deviations, for example the minimal standard deviation, with respect to the average measured curve or any other desired Minkowski q-metric can be used as numerical values.

For calculating the average measured curve (reference curve), it is preferred to use the median, since the median is more robust than the mean value and consequently the reference curve becomes smoother.

A further method is obtained if methods for characterizing bit maps are used for describing the existing parameter curves. Such methods are described in the publication EP 0 783 170, to the content of which reference is hereby made. In this case, the variation of a parameter over time is considered as a bit map. The following numerical values can be calculated, for example, from the normalized measured curves:

"percentage over mean": the percentage of the values which lie above the mean value of the entire measured curve considered, "deviation of mass": deviation of the values from the center of mass, "mass distribution", "fluctuations": represents a measure of the deviation of neighboring values, "monotony": global monotony of the measured curve, and "area": area which the curve encloses with the time axis.

The six numerical values listed above allow each of the curves to be meaningfully described. The input vector for the neural network consequently contains 6 numerical values for each desired parameter.

The following method is also suitable as a method for curve characterization: the two axes of the measured curve are subdivided into, for example, 3 "equidistant" portions. In the 9 portions produced in this way, the mean value and/or the standard deviation of the normalized measured values is calculated. In this way, 9 or 18 numerical values are generated for the input vector.

FIG. 2 shows a schematic representation of a two-dimensional numerical value space, which is defined by the numerical values mentioned. The small squares 10 in this case represent numerical value vectors, which describe normal states of a machining plant. These vectors define a domain in which the machining plant is operating normally and stably. The small square 11 represents a numerical value vector which describes an abnormal state, in which the machining plant is operating improperly. It can be seen that this abnormal state would not have been detected as abnormal in a "Univariate Statistical Equipment Control (SEC)" method; the numerical value vector both with respect to parameter 1 and with respect to parameter 2 lies within their respective upper and lower control limits.

As already mentioned, the use of an RCE network is divided into two phases: the "training phase" and the "recall phase". In the "training phase", the network is presented training vectors, on the basis of which the feature space is subdivided into various classes. If a very stably operating machining plant is concerned, the numerical values generated from the measured variables of a stable test run of the machining plant can be used as training vectors (prototypes) for a "normal" state of the machining plant.

Unfortunately, however, machining plants do not operate sufficiently stably, so that undesired or "abnormal" states of the machining plant may keep occurring during a training or test run. If in the training examples there are vectors which are to be assessed as "abnormal", these are incorrectly detected as normal in a later-following recall phase, since they have been trained as normal to the network. To prepare for the training of the neural network, therefore, the training vectors available must be analyzed precisely. From all the training vectors available, those which have to be regarded as "abnormal" are filtered out and excluded from the training. The network is preferably trained in such a way that on the one hand all abnormal deviations but on the other hand all normal states of the machining plants are detected. The number of error messages should of course be as low as possible, with as high a rate of defect detection as possible.

According to the invention, therefore, a method for automatically detecting "abnormal" states is provided.

For this purpose, a selectable number of input vectors is provided. The input vectors may be obtained, for example, from one or more test runs of a machining plant later to be monitored. Then, by means of a suitably selected measure of distance, the distance of each vector from every other vector is determined, so that preferably a symmetrical distance matrix whose main diagonal elements are all equal to zero is produced. The Euclidean distance between two vectors may be used, for example, as the measure of distance.

The decision as to whether an abnormal state exists is made on the basis of the distribution of these distances. Typical distance distributions are obtained both for the vectors which correspond to normal states and for the vectors which correspond to abnormal states. A vector which corresponds to a normal state has many further vectors in its neighborhood. Accordingly, many "small" distances occur in a distance distribution based on such a vector. The distance distribution of such a vector is therefore heavily based on "small" values.

A vector which corresponds to an abnormal state only has few further vectors in its neighborhood. Accordingly, many "large" distances occur in a distance distribution based on such a vector. The distance distribution of such a vector is therefore heavily based on "large" values.

To calculate the distance distribution, for example, every column of the distance matrix is sorted in ascending order. The ordered sequence of the distances is entered for each vector in its own system of coordinates. This produces a distance distribution or a cumulated distance distribution for each vector.

For comparison of the distance distributions, the value of the ordered sequence (characteristic value of the distribution) is used if a selectable percentage of all the vectors (for example 10% of all the vectors) are arranged within the distance value in question. This freely selectable percentage preferably corresponds to the percentage of "abnormal" factors occurring in the training vectors. If this characteristic value K of the distance distribution exceeds a certain threshold, the corresponding vector is a vector which corresponds to an abnormal state. If the characteristic value K of the distance distribution remains below the threshold value, the corresponding vector is a vector which corresponds to a normal state. FIGS. 3a and 3b show distance plots for a normal state (FIG. 3a) and an abnormal state (FIG. 3b). It can be seen that the characteristic value K in the case of the normal state is distinctly less than the characteristic value K in the case of the abnormal state. In the case of the normal state, the characteristic value K lies below the threshold value S and in the case of the abnormal state the characteristic value K lies above the threshold value S.

To find out how many abnormal vectors there are in the data, the distribution function of the characteristic values can be used.

Some of the numerical values which serve as components of the input vectors for a classifier have distributions which have a number of distinctly separate distribution maxima. This may lead to misjudgements in the search for abnormal vectors. It is therefore preferred if weighted measures of distance are used as measures of distance for determining the distance of each vector from every other vector. In particular, it is preferred if the measures of distance are weighted according to the information content/entropy (or a function of the information content/entropy) of the respective numerical value. The entropy of the distribution of a numerical value can be calculated as follows:

$$S^i = k\Sigma_j p^i_j ln(p^i_j),$$

where $p^i_j$ indicates the probability that the i-th numerical value will assume the j-th value, and k is a selectable constant. Consequently, obtained for example as the weighted measure of distance between two vectors is $$d(x, y) = (\Sigma_i (x^i - y^i)^q)^{1/q}$$

or $$d(x, y) = (\Sigma_i f(S^i)(x^i - y^i)^q)^{1/q},$$

where f(S) is a suitably selected function of the entropy. By taking into consideration the entropy of the numerical value distribution, appropriate handling of multimodal data is also ensured.

What is claimed is:

1. A method of monitoring and/or controlling machining plants having time-dependent machining parameters, which comprises:

measuring desired time-dependent machining parameters of a machining plant as a measured curve;

generating time-independent numerical values from the measured machining parameters;

entering the time-independent numerical values into a classifier distinguishing between normal states of the machining plant and abnormal states of the machining plant;

filtering out training vectors regarded as abnormal from training vectors available by determining a distance of each training vector from every other training vector with a selected measure of distance for filtering of the abnormal training vectors, the training vectors having components made of time-independent numerical values; and training the classifier with training vectors.

2. The method according to claim 1, which further comprises providing a neural network as the classifier.

3. The method according to claim 1, which further comprises using one of a group consisting of a hypersquare and a hypersphere with a radius $\lambda_j$ as a domain around a prototype.

4. The method according to claim 1, which further comprises satisfying requirements of universality, similitude, robustness, and normalization with the time-independent numerical values.

5. The method according to claim 1, which further comprises filtering out training vectors for which a distance value K of an ordered sequence of distances in which a prescribed percentage of all the vectors have smaller distances from a training vector in question exceeds a prescribed threshold value.

6. The method according to claim 1, which further comprises using weighted measures of distance as measures of distance for determining a distance of each training vector from every other training vector.

7. The method according to claim 2, which further comprises providing an RCE network as the classifier.

8. The method according to claim 4, which further comprises approximating time-dependent measured curves of a desired machining parameter by a linear combination of polynomials, and using coefficients $c_i$ of the linear combination as time-dependent numerical values.

9. The method according to claim 4, which further comprises using, as numerical values, distances of the measured curve with respect to prescribed comparison curves.

10. The method according to claim 4, which further comprises calculating an average measured curve from the measured curves of a machining parameter and using deviations with respect to the average measured curve as numerical values.

11. The method according to claim 4, which further comprises using, as numerical values, characteristic variables for characterizing the measured curves conceived as bit maps.

12. The method according to claim 4, which further comprises:

subdividing the measured curve into portions; and using, as numerical values, at least one of mean values and standard deviations from the portions.

13. The method according to claim 6, which further comprises weighting the measures of distance according to at least one of information content, information entropy, a function of the information content of the respective numerical value, and a function of the information entropy of the respective numerical value.

14. The method according to claim 8, which further comprises carrying out the approximating step by approximating time-dependent measured curves of a desired machining parameter by a linear combination of orthogonal polynomials.

15. A method of filtering vectors regarded as abnormal from a set of vectors, which comprises:

determining a distance of each vector from every other vector by a selected measure of distance; and filtering out vectors for which a distance value K of ordered sequence of distances in which a prescribed percentage of all the vectors have smaller distances from a vector in question exceeds a prescribed threshold value.

16. The method according to claim 15, which further comprises using weighted measures of distance as measures of distance for determining the distance of each vector from every other vector.

17. The method according to claim 16, which further comprises weighting the measures of distance according to at least one of information content, information entropy, a function of the information content of the respective vector components, and a function of the information entropy of the respective vector components.

* * * * *